United States Patent [19]

Bingle et al.

[11] 4,118,259

[45] Oct. 3, 1978

[54] WELDED PLASTIC BEARING CAGE AND METHOD OF MAKING SAME

[75] Inventors: Gerald L. Bingle, St. Clair Shores, Mich.; Melvin L. Earsley, Lubbock, Tex.

[73] Assignee: Federal-Mogul Corporation, Detroit, Mich.

[21] Appl. No.: 645,968

[22] Filed: Jan. 2, 1976

Related U.S. Application Data

[62] Division of Ser. No. 501,515, Aug. 29, 1974, Pat. No. 3,944,307.

[51] Int. Cl.² .............................................. B32B 31/20
[52] U.S. Cl. .................................... 156/73.1; 156/87; 156/294; 264/23; 308/217

[58] Field of Search ....................... 156/73.1, 293, 294, 156/87; 264/69, 23; 228/1; 308/217

[56] References Cited

U.S. PATENT DOCUMENTS

| 3,068,552 | 12/1962 | Williams et al. | 156/293 |
| 3,256,051 | 6/1966 | Howe | 156/73.1 |
| 3,365,255 | 1/1968 | Altson | 308/217 |
| 3,387,901 | 6/1968 | Williams | 308/217 |

*Primary Examiner*—Edward G. Whitby
*Attorney, Agent, or Firm*—Harness, Dickey and Pierce

[57] ABSTRACT

A weldable assembly and a method of fabricating a plastic bearing cage employing ultrasonic welding techniques.

4 Claims, 10 Drawing Figures

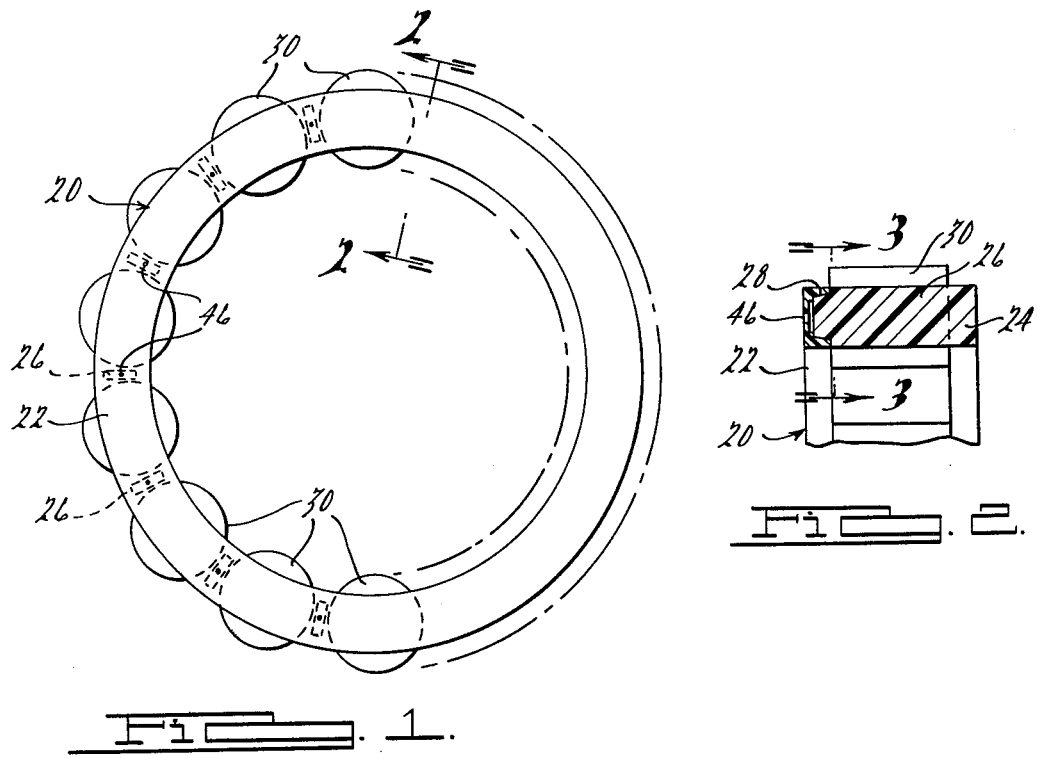
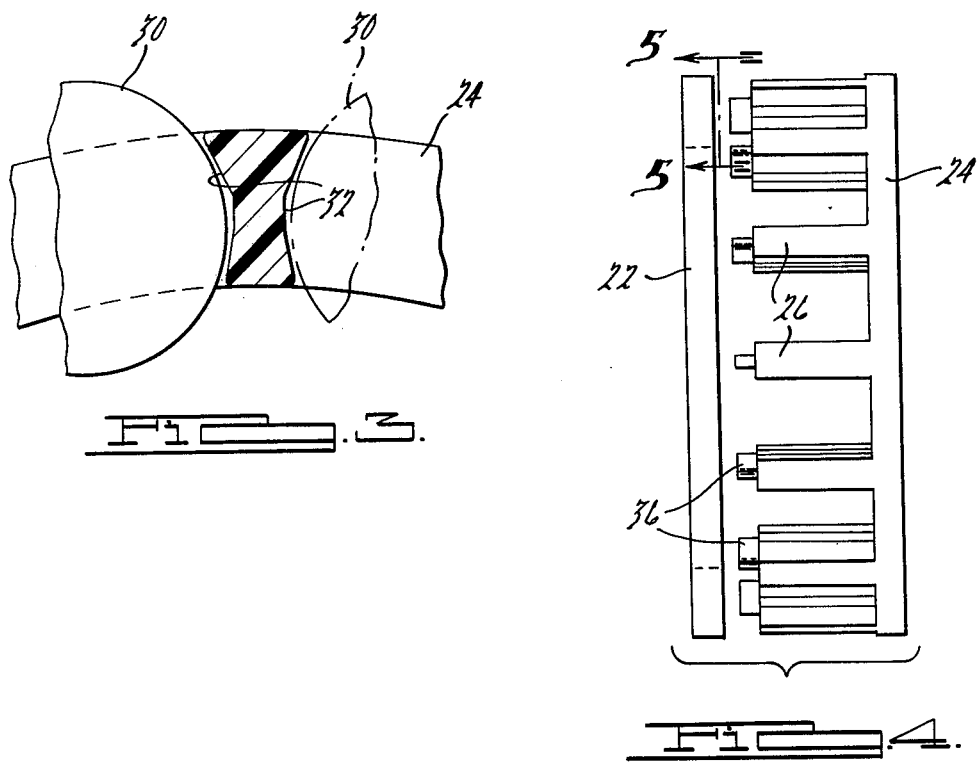

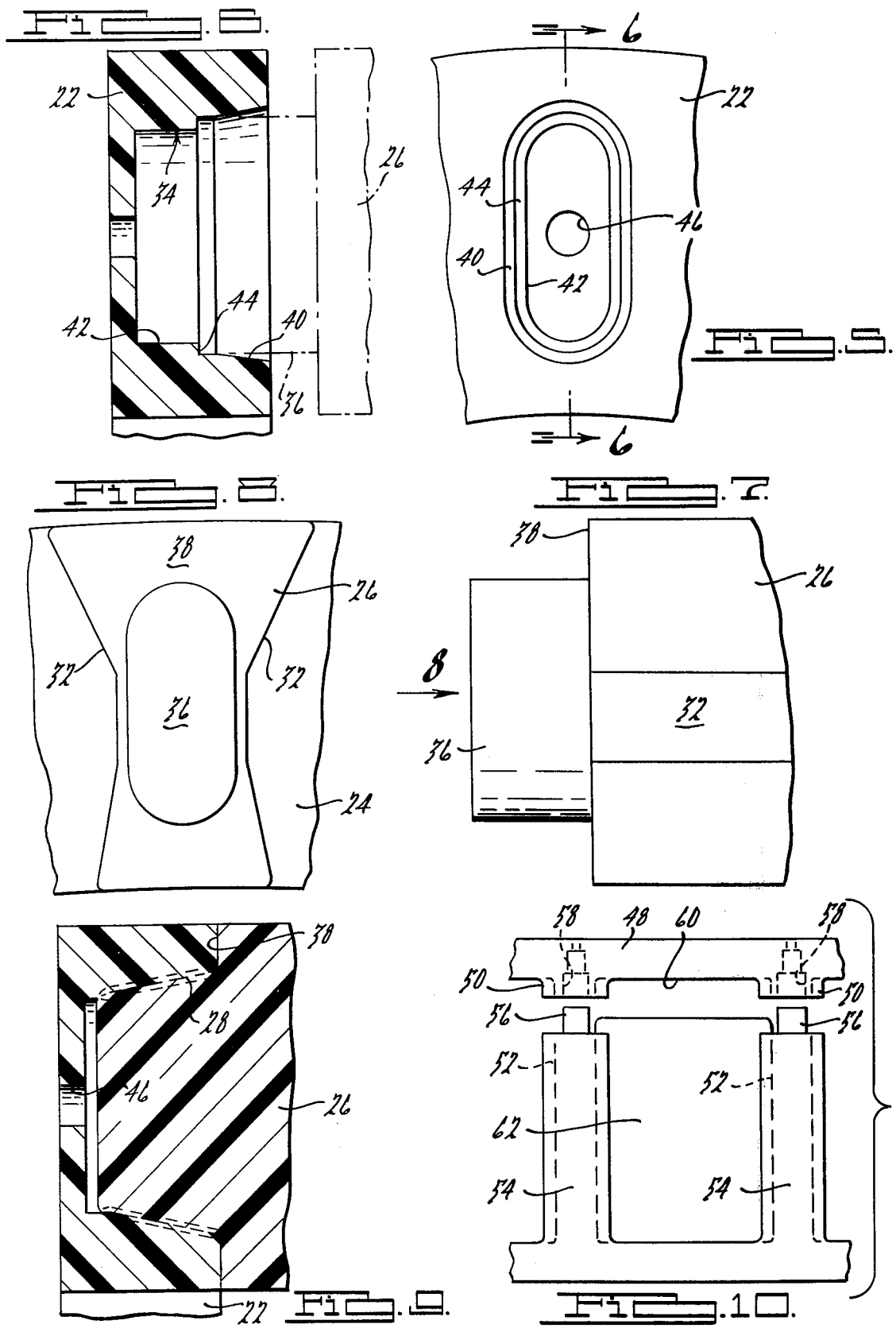

WELDED PLASTIC BEARING CAGE AND METHOD OF MAKING SAME

This is a division, of application Ser. No. 501,515, filed Aug. 29, 1974 now U.S. Pat. No. 3,944,307.

BACKGROUND OF THE INVENTION

The present invention is broadly applicable to antifriction bearing assemblies and particularly to plastic bearing cages for retaining a plurality of antifriction bearing elements, such as rollers, in appropriate circumferentially spaced relationship and in quiet rolling contact between annular concentric inner and outer bearing races. It has been customary, in accordance with prior art practices, to employ metallic bearing cages which are usually quite expensive and difficult to fabricate and have in some instances resulted in premature bearing failure due to an abnormally high degree of wear and attendant temperature increases as a result of frictional contact between the antifriction elements and the associated bearing cages. Some of these problems have been overcome by molding bearing cages out of reinforced synthetic resins having lubricity properties, providing certain cost advantages as well as a reduction in noise and abrasion during bearing use. Typical of such plastic bearing retainers is that disclosed in U.S. Pat. No. 3,387,901, which is assigned to the assignee of the present invention.

The lower strength of plastic materials in comparison to metal has occasioned an increased need for plastic bearing cage constructions which provide for the necessary mechanical strength properties to provide for a long and satisfactory bearing service life, while at the same time enabling a simple and economical assembly of its component parts into a high-strength integral retainer. The weldable plastic bearing cage and its method of manufacture in accordance with the novel features of the present invention overcomes many of the problems and disadvantages associated with prior art practices and constitutes a still further improvement over the construction and method of fabrication as described in the aforementioned United States patent.

SUMMARY OF THE INVENTION

The benefits and advantages of the present invention are achieved in accordance with the structural aspects of the present invention by a weldable assembly comprising two separate components that are adaptable to be ultrasonically welded into a high-strength integral plastic bearing cage. The assembly comprises a pair of annular side rails and a plurality of circumferentially spaced axially extending ribs affixed at one of their ends to one of the side rails. The exposed ends of the ribs are formed with coacting means, such as projections or studs, which are adapted to cooperate with a conforming aperture provided in the opposed surface of the adjacent side rail in which the end portion of the projection is disposed in interferring telescopic relationship. In accordance with the preferred practice, the aperture is formed in the side rail and is provided with a first section which is of a cross sectional configuration generally conforming to the cross sectional configuration of the end portion of the projection, and a second inwardly spaced section which is of a cross sectional configuration different than that of the projection and forms a shoulder at its intersection with the first section against which the end of the projection is disposed in abutting relationship prior to the final assembly step of welding. The end of each rib is formed with a face coplanar with the face of the opposed side rail surface and serves as a stop for gauging the axial spacing between the side rails and the axial width of the bearing pockets defined therebetween.

In accordance with the method aspects of the present invention, the molded components are assembled with the projections disposed in interferring telescopic relationship within the corresponding apertures and the resultant assembly is ultrasonically vibrated while a force is applied tending to cause the side rails to move toward each other in a manner so as to effect a heat softening of the plastic material in the region of interference between the projections and apertures, enabling deformation thereof and inward movement of the projections until the end face of each rib is disposed in abutting relationship against the opposed face of the adjacent side rail. The ultrasonically welded assembly is thereafter allowed to cool under pressure, forming a high-strength weld connection between the ribs and side rails and a unitary bearing cage.

Further economies are provided in accordance with the method and article aspects of the present invention by controlling the configuration of the cage components such that they can be readily molded to accurate final dimensions employing high-speed plastic molding techniques, and wherein the resultant ultrasonic welding of the components produces a cage assembly requiring no further finishing operations.

Additional benefits and advantages will become apparent upon a reading of the description of the preferred embodiments taken in conjunction with the accompanying drawings.

BRIEF DESCRIPTION OF THE DRAWINGS

FIG. 1 is a fragmentary end elevational view of a plastic bearing cage constructed in accordance with one embodiment of the present invention and incorporating a plurality of straight rollers in the roller pockets thereof;

FIG. 2 is a fragmentary transverse sectional view through the assembly shown in FIG. 1 as viewed substantially along the line 2—2 thereof;

FIG. 3 is a magnified fragmentary sectional view through a rib of the plastic bearing cage shown in FIG. 2 as viewed substantially along line 3—3 thereof;

FIG. 4 is an exploded end elevational view of two of the cage components preparatory to assembly thereof;

FIG. 5 is an enlarged view of an aperture in a side rail of one of the components shown in FIG. 4 and as viewed in the area indicated by the arrows at 5—5 thereof;

FIG. 6 is a transverse sectional view through the side rail shown in FIG. 5 and taken substantially along the line 6—6 thereof;

FIG. 7 is an enlarged fragmentary side elevational view of a rib and a projection thereon in accordance with the components as shown in FIG. 4;

FIG. 8 is an end elevational view of the rib shown in FIG. 7 viewed in the direction of the arrow indicated at 8;

FIG. 9 is a cross sectional view taken through one connection after ultrasonic welding thereof; and FIG. 10 is a fragmentary exploded view of an alternative satisfactory embodiment of components that are weldable into an integral bearing cage.

DESCRIPTION OF THE PREFERRED EMBODIMENTS

Referring now in detail to the drawings and as best seen in FIGS. 1-3, a welded bearing cage assembly 20 comprises a pair of annular spaced side rails 22, 24, and a plurality of axially extending ribs 26 disposed at circumferentially spaced intervals which are integrally molded and united at one of their ends to one of the side rails. The other end of the ribs 26 are securely bonded by means of welded joints, indicated at 28 in FIGS. 2 and 9, produced by an ultrasonic welding technique subsequently to be described in greater detail.

The inner surfaces of the side rails 22, 24 and the opposed surfaces of adjacent ribs 26 define pockets within each of which an anti-friction element, such as a straight cylindrical roller 32, is retained in appropriate circumferentially spaced relationship. The axially extending faces 32 of the ribs are of a generally concave multisided configuration so as to provide a dual line contact with a clearance fit therebetween with the periphery of the roller when the roller and cage assembly is incorporated between inner and outer raceways (not shown), thereby minimizing friction and mutual wear. While it is contemplated that the rollers can be assembled in the pockets before welding the plastic components into an integral cage, it is usually preferred, as in the case of the bearing cage shown in the drawings, to first weld the plastic components into an integral cage, whereafter the bearing elements such as the rollers can be snapped into the pockets as the result of the resiliency of the ribs to yieldably deflect to receive the bearing element.

The material of which the side rails and ribs are comprised may consist of any thermoplastic or semi-thermoplastic material which is heat softenable and can be welded ultrasonically. Particularly satisfactory results are obtained employing fiber reinforced nylon plastic which possesses inherent lubricity characteristics, although alternative materials, such as acetal resins and acrylic resins, can also be satisfactorily employed for this purpose. The plastic material is further characterized as one which is moldable to form the separate bearing cage components which are of accurate final dimensions and possess the required heat resistance and surface finish.

As best shown in FIGS. 4-8, cooperating means are provided on the side rails 22 and on the ends of the cross bars or ribs 26 to align the components during assembly and subsequently form a high-strength welded joint. In the specific embodiment illustrated, the side rail 22 is formed with a plurality of apertures 34 disposed at spaced circumferential increments around the inner surface thereof, which are adapted to receive a lug or projection 36 of a generally oval cross sectional configuration integrally affixed to and projecting axially of the exposed end faces 38 of the ribs 26. As best seen in FIGS. 5 and 6, the aperture 34 comprises a first section 40 of a cross sectional size and configuration which generally conforms to that of the projection 36 but is slightly larger so as to be always adapted to slidably receive the end portion of the projection throughout the range of reasonable manufacturing tolerances in a manner as shown in phantom in FIG. 6. At times this will result in an interference fit and this is acceptable. The primary consideration underlying the requirement for a close fit is to minimize the amount of plastic flow during the welding operation to only that which is necessary to acquire a good bond. The first section 40, as shown in FIG. 6, is formed with an outer taper to facilitate alignment of the end of the projection during assembly operations. A second or inner section 42 of the aperture is of a smaller cross sectional configuration, forming at its intersection with the first section an annular shoulder 44 against which the peripheral end portion of the projection 36 is adapted to be disposed in abutting relationship prior to the ultrasonic welding of the assembly.

It is also advantageous in some applications, particularly when the outer diameter to inner diameter section of side rail 22 is small, to form first section 40 with a radius rather than the taper. With either the radius or taper there is provided the added advantage that each acts as a flash trap for excess plastic, if any.

There exists a close fit between the side walls of projection 36 and annular wall 43 of the aperture. Upon the application of an axial force to the preliminarily assembled components and the simultaneous supersonic vibration thereof there is caused a heat softening of the plastic in the region immediately adjacent to the annular shoulder and the peripheral edge surface of the projection, resulting in deformation and flow thereof. This deformation and flow of material is accompanied by a further inward telescopic and wedging interference type movement of the projection relative to the aperture. The melting or heat softening of the material accompanied by the relative movement between the components results in a smearing action of the two melt surfaces, forming upon subsequent cooling thereof a uniform high-strength welded connection with an interfused zone of plastic indicated by the dotted lines of the joint 28 in FIG. 9. In accordance with the preferred practice, the base of the aperture 34 is formed with a vent port, indicated at 46, for venting any entrapped air and gaseous products formed during the ultrasonic welding operation.

In accordance with an alternative embodiment as illustrated in FIG. 10, a side rail 48 is formed with a plurality of circumferentially spaced lands or raised sections 50 which are provided with radial side configurations corresponding generally to the concave configuration of the axially extending side surfaces 52 of the ribs 54. The opposite side rail 56 with the ribs 54 integrally affixed thereto is generally identical to the side rail 24 previously described and includes a projection 56 extending axially of the end face of each of the ribs and is adapted to telescope within a stepped aperture 58 in the side rail 48. The raised side rail construction, as shown in FIG. 10, is employed when the thickness of the rail itself is reduced to an extent wherein adequate weld joint area obtained would otherwise be inadequate to provide the requisite strength. The provision of lands 50 increases the effective length of the aperture and thus the area of the resultant welded joint. The recessed sections between the lands 50, indicated at 60 in FIG. 10, are of a depth and are shaped to receive the roller end-break portion of an anti-friction roller 62 adapted to be retained within each roller pocket.

While it will be apparent that the invention herein disclosed is well calculated to achieve the benefits and advantages as hereinabove set forth, it will be appreciated that the invention is susceptible to modification, variation and change without departing from the spirit thereof.

What is claimed is:

1. The method of making a bearing retainer which comprises the steps of providing a pair of molded thermoplastic annular side rails having a plurality of circumferentially spaced axially extending ribs affixed at one of their ends to one of the side rails, providing the exposed end of each rib and the opposed surface of the adjacent side rail with a cooperating aperture and projection adapted to be disposed in axial aligned relationship, forming said aperture with a first portion to slidably receive an end portion of said projection and a second inward portion of reduced cross sectional area forming a shoulder at its intersection with said first portion, preliminarily assembling said rails by positioning said projections in partial telescopic relationship within said apertures with the peripheral end portion of said projection disposed in abutting relationship against said shoulder, ultrasonically vibrating the assembly and applying an axial force in a direction urging the side rails together, continuing the vibration of the assembly and maintaining said axial force for a period of time sufficient to effect a heat softening of the material adjacent to the abutting surfaces of said projections and said apertures to permit a deformation and flow of the material and a further telescopic movement of the projections into the apertures until the side rails move together to the desired spaced substantially parallel relationship, venting the interior of said apertures to the atmosphere to enable escape of entrapped gases from the interior thereof during the telescopic movement of the projections into the apertures, and thereafter discontinuing the vibration and permitting the heat softened material to cool and harden into a welded connection forming an integral bearing retainer.

2. The method as defined in claim 1, in which the apertures are formed in one side rail and the projections are formed on the exposed ends of the ribs.

3. The method as defined in claim 1, including the further step of providing said first portion with an outwardly directed taper to facilitate alignment of said projection with said aperture during the assembly thereof.

4. The method as defined in claim 1, further including providing the exposed end of said rib with an end face and urging the side rails together during the ultrasonic vibration welding thereof until the end face is disposed in abutting relationship against the opposed surface of the adjacent side rail.

* * * * *